United States Patent
Hao et al.

(10) Patent No.: US 11,741,612 B2
(45) Date of Patent: Aug. 29, 2023

(54) IMAGE BINARIZATION METHOD AND ELECTRONIC DEVICE

(71) Applicant: Nuvoton Technology Corporation, Hsinchu (TW)

(72) Inventors: Yu-Ti Hao, Hsinchu (TW); Tzu-Lan Shen, Hsinchu (TW)

(73) Assignee: Nuvoton Technology Corporation, Hsinchu (TW)

( * ) Notice: Subject to any disclaimer, the term of this patent is extended or adjusted under 35 U.S.C. 154(b) by 430 days.

(21) Appl. No.: 17/035,721

(22) Filed: Sep. 29, 2020

(65) Prior Publication Data
US 2021/0174467 A1 Jun. 10, 2021

(30) Foreign Application Priority Data
Dec. 9, 2019 (TW) .................................. 108144910

(51) Int. Cl.
| | | |
|---|---|---|
| *G06K 9/00* | (2022.01) | |
| *G06T 7/11* | (2017.01) | |
| *G06T 1/00* | (2006.01) | |
| *G06T 1/60* | (2006.01) | |
| *G06T 1/20* | (2006.01) | |
| *G06V 10/50* | (2022.01) | |
| *G06V 10/24* | (2022.01) | |

(52) U.S. Cl.
CPC .............. *G06T 7/11* (2017.01); *G06T 1/0007* (2013.01); *G06T 1/20* (2013.01); *G06T 1/60* (2013.01); *G06V 10/50* (2022.01); *G06V 10/245* (2022.01)

(58) Field of Classification Search
None
See application file for complete search history.

(56) References Cited

U.S. PATENT DOCUMENTS

| | | | | | |
|---|---|---|---|---|---|
| 5,992,753 | A | * | 11/1999 | Xu ..................... | G06K 7/10722 235/472.01 |
| 6,628,840 | B1 | * | 9/2003 | Aschenbrenner ..... | G06T 11/203 382/256 |
| 2006/0274171 | A1 | * | 12/2006 | Wang .................... | H04N 23/00 348/E5.042 |
| 2007/0025625 | A1 | * | 2/2007 | Burian .................... | G06T 7/136 382/237 |
| 2007/0297679 | A1 | * | 12/2007 | Sato ................. | G06K 19/06037 382/192 |

(Continued)

FOREIGN PATENT DOCUMENTS

| | | | |
|---|---|---|---|
| TW | 201710957 | 3/2017 | |
| WO | WO-2013163789 A1 * | 11/2013 | ......... G06K 7/10722 |

*Primary Examiner* — Avinash Yentrapati
(74) *Attorney, Agent, or Firm* — JCIPRNET

(57) ABSTRACT

An image binarization method and an electronic device using the same are provided. The method includes capturing an image by an image capturing device; selecting a target pixel row arranged at the front from one or more unselected first pixel rows among M pixel rows of the image according to a row order by a binarization circuit; performing, by the binarization circuit, a binarization operation on the target pixel row to obtain a binarized pixel row; storing the binarized pixel row to a main memory by the binarization circuit; performing, by the binarization circuit, the binarization operation to the remaining one or more first pixel rows until M binarized pixel rows are obtained, so as to complete the binarization operation.

20 Claims, 6 Drawing Sheets

(56) References Cited

U.S. PATENT DOCUMENTS

| | | | |
|---|---|---|---|
| 2009/0324120 A1* | 12/2009 | Farouki | G06V 30/414 |
| | | | 382/256 |
| 2010/0183234 A1* | 7/2010 | Aoyagi | H04N 1/4052 |
| | | | 382/252 |
| 2012/0033894 A1* | 2/2012 | Liu | G06K 7/1478 |
| | | | 382/275 |
| 2014/0029361 A1* | 1/2014 | Ito | G06T 1/60 |
| | | | 365/189.16 |
| 2017/0076191 A1* | 3/2017 | Feng | G06K 19/06037 |
| 2020/0103825 A1* | 4/2020 | Kim | G02B 27/0093 |

* cited by examiner

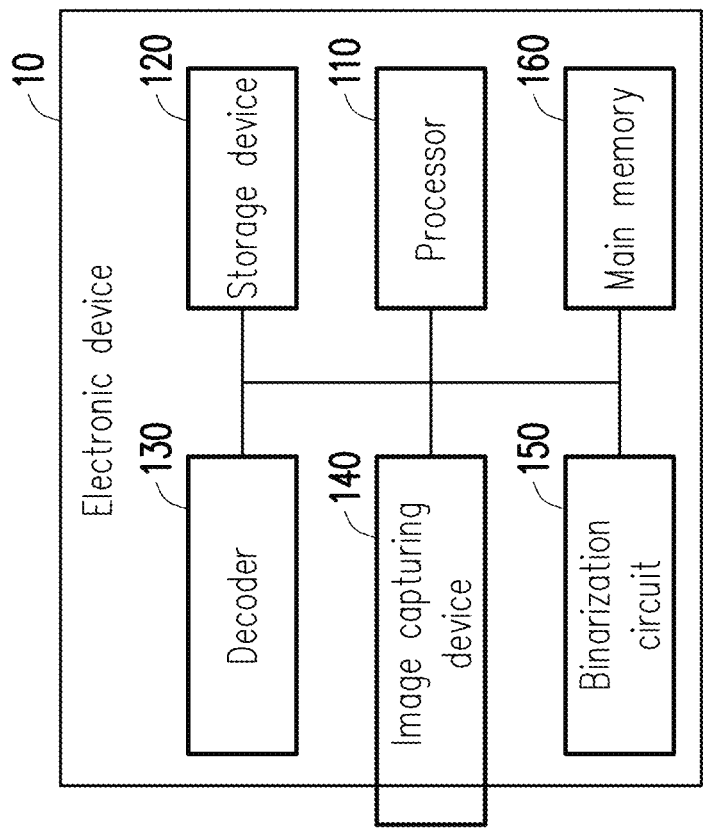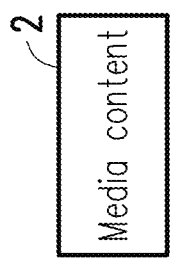
FIG. 1

| P(i) | P(1) | P(2) | P(3) | P(4) | P(5) | P(6) | P(7) | P(8) | P(9) | P(10) | P(11) | P(12) | P(13) | P(14) | P(15) | P(16) | P(17) | P(18) |
|---|---|---|---|---|---|---|---|---|---|---|---|---|---|---|---|---|---|---|
| Bit value | 13 | 10 | 17 | 33 | 181 | 193 | 182 | 190 | 191 | 189 | 158 | 179 | 180 | 164 | 140 | 110 | 78 | 60 |
| PAD | 0 | 3 | 7 | 16 | 148 | 12 (160) | 9 (149) | 8 (157) | 1 | 2 | 31 | 21 (10) | 1 (9) | 16 (25) | 24 | 30 | 32 | 18 |
| PADA | 10 | 6.5 | 6.67 | 9 | 10 | 11 | 10.3 | 9.75 | 8 | 7 | 10 (9.125) | 11.75 | 10.5 | 11.1 | 12.3 | 13.75 | 15.2 (10) | 14 |
| Dynamic threshold | 35 | 24.5 | 25 | 32 | 35 | 38 | 35.9 | 34.25 | 29 | 26 | 32.375 | 40.25 | 36.6 | 38.3 | 41.8 | 46.25 | 50.5 (35) | 47 |
| Accumulative error | 0 | −3 | +4 | +20 | +168 (0) | +12 | +3 | +11 | +12 | +10 | −22 | −1 | 0 | −16 | −40 | −70 | −102 (0) | −18 |
| Binary value | 0 | 0 | 0 | 0 | 1 | 1 | 1 | 1 | 1 | 1 | 0 (1) | 1 | 1 | 1 | 1 | 1 | 1 (0) | 0 |

◎ Initial pixel threshold=128
◎ Initial value of pixel absolute difference=0
◎ Preset pixel absolute difference average=10

◎ Dynamic threshold=pixel absolute difference average*first parameter+second parameter, initial value of first parameter=3

◎ Initial value of second parameter=5

◎ First error threshold=−100

◎ Second error threshold=100

◎ Different color determining length=3

FIG. 6

IMAGE BINARIZATION METHOD AND ELECTRONIC DEVICE

CROSS-REFERENCE TO RELATED APPLICATION

This application claims the priority benefit of Taiwan application no. 108144910, filed on Dec. 9, 2019. The entirety of the above-mentioned patent application is hereby incorporated by reference herein and made a part of this specification.

TECHNICAL FIELD

The invention relates to a binarization method, and more particularly, to an image binarization method and an electronic device using the method.

BACKGROUND

QR code is the current mainstream two-dimensional barcode that allows users to use a handheld device or a dedicated barcode scanner to capture an image containing QR Code through a camera, so as to decode the corresponding information.

In general, the handheld device or the dedicated barcode scanner first captures the image containing QR Code, and then obtains optimal binarization parameters by analyzing the entire image. The binarization operation of the conventional algorithm needs to analyze the entire image in order to obtain the optimal binarization thresholds corresponding to the entire image. Then, by comparing the respective luminance values (color bit values) of all pixels of the image with the optimal binarization thresholds, binary values of all pixels of the image are determined.

Therefore, the handheld device or the dedicated barcode scanner needs to store the entire image in a memory in advance. Taking a 640×680 monochrome picture as an example, at least 425 (640*680*8/1024/8) KB of storage space is required. This size is not a problem for a main memory of a mobile phone or a high-end processor, but most microcontrollers are unable to handle applications/decoding related to QR Code due to a limited memory (usually about 64 KB).

In view of this, those skilled in the art are committed to developing other methods to enable electronic devices/processors with small storage space to efficiently capture and process the binarization operation of the image, thereby expanding the function of the electronic device/processor having the memory with smaller storage space.

The information disclosed in this "Description of Related Art" section is only for enhancement of understanding of the background of the invention and therefore it may contain information that does not form the prior art that is already known to a person of ordinary skill in the art. Furthermore, the information disclosed in this "Description of Related Art" section does not mean that one or more problems to be resolved by one or more embodiments of the invention were acknowledged by a person of ordinary skill in the art.

SUMMARY

The invention provides an image binarization method and an electronic device, which can convert an image into a smaller binarized image and store the binarized image in a memory, so as to expand the function of the electronic device/processor having the memory with smaller storage space.

An embodiment of the invention provides an image binarization method adapted to an electronic device having a main memory having a small capacity. The electronic device further includes an image capturing device and a binarization circuit. The method includes: capturing an image by the image capturing device, wherein the image includes a plurality of pixels in an M×N matrix, wherein M and N are positive integers, wherein a size of the main memory is Y*M*N bits, wherein Y is a preset positive integer corresponding to the main memory; selecting a target pixel row arranged at the front from one or more unselected first pixel rows among M pixel rows of the image according to a row order by the binarization circuit; performing, by the binarization circuit, a binarization operation on the target pixel row to obtain a binarized pixel row; storing the binarized pixel row to a main memory by the binarization circuit; determining, by the binarization circuit, whether the M pixel rows are all selected; in response to the M pixel rows not all being selected, performing the step of selecting the target pixel row arranged at the front from the one or more unselected first pixel rows among the M pixel rows of the image according to the row order by the binarization circuit again; in response to the M pixel rows all being selected, completing the binarization operation on the image.

Another embodiment of the invention provides an electronic device, which includes an image capturing device; a main memory; and a binarization circuit. The binarization circuit is electrically connected to the image capturing device and the main memory. The image capturing device is configured to capture an image, wherein the image includes a plurality of pixels in an M×N matrix, wherein M and N are positive integers, wherein a size of the main memory is Y*M*N bits, and Y is a preset positive integer corresponding to the main memory. Further, the binarization circuit is configured to select a target pixel row arranged at the front from one or more unselected first pixel rows among M pixel rows of the image according to a row order. The binarization circuit is further configured to perform a binarization operation on the target pixel row to obtain a binarized pixel row, and store the binarized pixel row to the main memory. The binarization circuit is further configured to determine whether the M pixel rows are all selected, wherein in response to the M pixel rows not all being selected, the binarization circuit is further configured to perform the step of selecting the target pixel row arranged at the front from the one or more unselected first pixel rows among the M pixel rows of the image according to the row order by the binarization circuit again, wherein in response to the M pixel rows all being selected, the binarization circuit is further configured to complete the binarization operation on the image.

Based on the above, the image binarization method and the electronic device provided by the various embodiments of the invention can allow the electronic device/processor/microcontroller having the memory with smaller storage space to efficiently capture the image and perform the binarization operation on the image to convert the image into a smaller binarized image. The converted binarized image can be stored in the memory with smaller storage space and can be further decoded, thereby expanding the function of the electronic device/processor having the memory with smaller storage space. As a result, the electronic devices/processors/microcontrollers with smaller memory can also serve the application fields of 2D barcodes (or other image processing). Accordingly, the working efficiency of the electronic device/processor/microcontroller can be further enhanced and the cost of purchasing an electronic device/processor/microcontroller with larger memory can be saved.

To make the aforementioned more comprehensible, several embodiments accompanied with drawings are described in detail as follows.

BRIEF DESCRIPTION OF THE DRAWINGS

FIG. 1 is a block diagram of an electronic device illustrated according to an embodiment of the invention.

FIG. 6 is a schematic diagram of converting the target pixel row into a binarized pixel row illustrated according to an embodiment of the invention.

DETAILED DESCRIPTION

Figure 2:
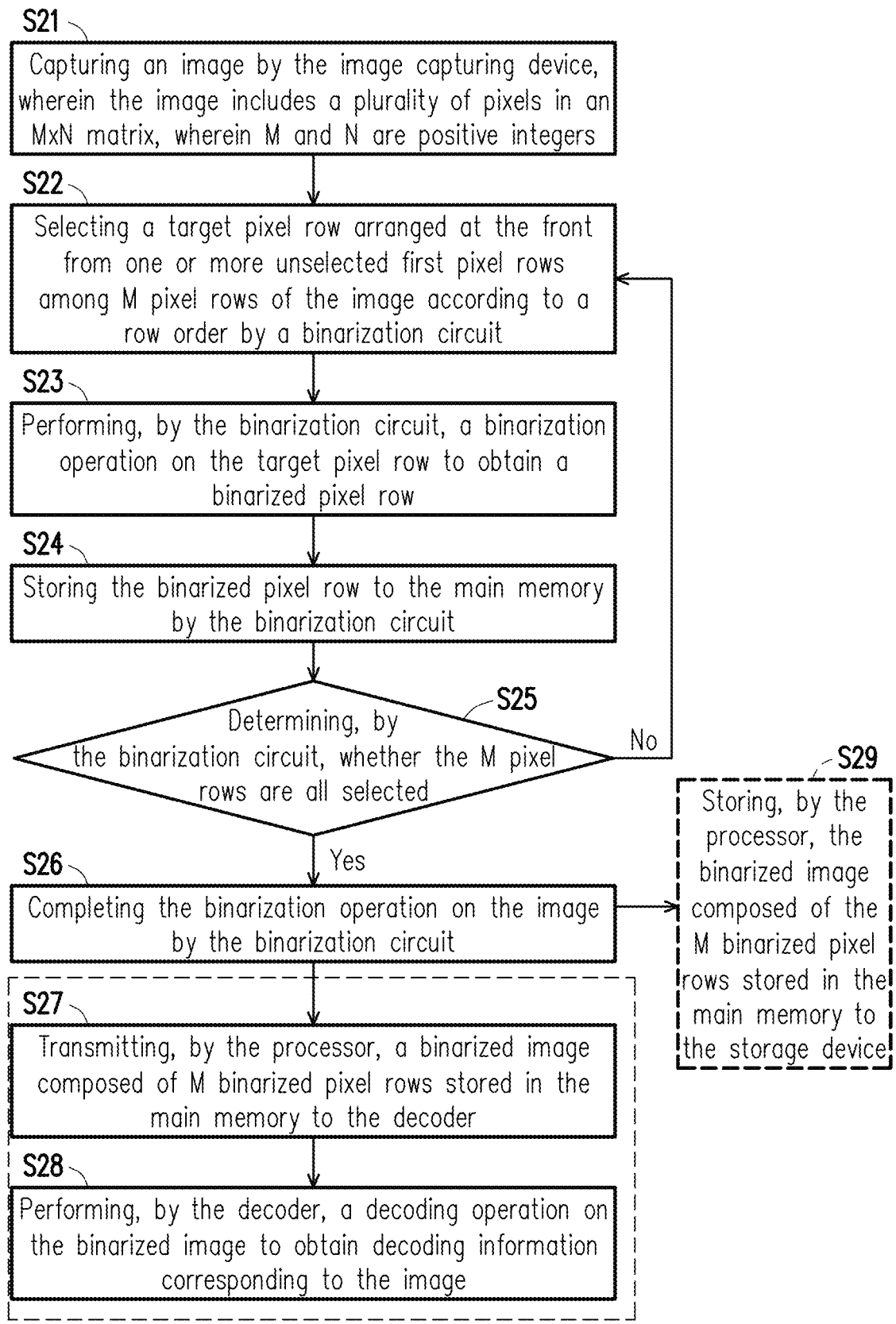
FIG. 2 is a flowchart of an image binarization method illustrated according to an embodiment of the invention.

FIG. 1 is a block diagram of an electronic device illustrated according to an embodiment of the invention. Referring to FIG. 1, in this embodiment, an electronic device 10 includes a processor 110, a storage unit 120, a decoder 330, an image capturing device 140, a binarization circuit 150 and a main memory 160. In this embodiment, the electronic device 10 is configured to capture an image of media content 20 through the image capturing device 140 and eventually obtain information corresponding to the media content contained in the captured image. The media content 20 is, for example, a one-dimensional barcode, a two-dimensional barcode or other suitable encoded images. The media content may be printed on the surface of various materials or displayed via a display device.

In this embodiment, the processor 110 is hardware with computing capability. The processor 110 is configured to execute one or more program codes to manage the overall operation of the electronic device 10. In this embodiment, the processor 110 is, for example, a central processing unit (CPU) of single-core or multi-core, a programmable microprocessor, a digital signal processor (DSP), a programmable controller, an application specific integrated circuits (ASIC), a programmable logic device (PLD) or other similar devices.

The storage device 120 is configured to store data that needs to be stored for a long time through instructions from the processor 110. For example, the storage device 120 records firmware or software used to manage the electronic device 10. The storage device 120 may be any type of storage circuit module configured with a non-volatile memory module (e.g., a NAND flash memory module). In an embodiment, the storage device 120 is, for example, a storage circuit module having a memory card slot, and can access data stored in a memory card in the memory card slot.

The decoder 130 is configured to perform a decoding operation on the binarized image or the captured image to obtain decoding information contained in the image (e.g., decoding information corresponding to the media content). In an embodiment, the decoder 130 may be integrated into the processor 110. In an embodiment, the decoder 130 may be implemented by software as a decoding application program having the functions of the decoder 130, and the processor 110 may execute the decoding application program to perform the decoding operation.

The image capturing device 140 includes a lens and an image sensor device. The image sensor device may be, for example, a charge-coupled device (CCD) image sensor or a complementary metal oxide semiconductor (CMOS) image sensor. The image capturing device 140 is, for example, a single-lens or multi-lens camera. The image capturing device 140 is configured to take photos or videos of the media content 20 to capture an image or a video corresponding to the media content. The captured image includes a plurality of pixels in an M×N matrix. M and N are positive integers. Each pixel has a bit value (a.k.a. a luminance value, a grayscale value or a color value). A size of the bit value of each pixel may be greater than 1 bit. For example, if the bit value of each pixel has a luminance value of 8 bits, the luminance value may range from 0 (pure black) to 255 (pure white).

The binarization circuit 150 is electrically connected to the image capturing device 140, and configured to perform a binarization operation on the captured image to obtain a binarized image. It should be noted that, in this embodiment, the binarization circuit 150 performs the binarization operation the image captured by the image capturing device 140 before the image is temporarily stored/stored in the main memory 160. After obtaining the binarized image, the binarization circuit 150 is further configured to store the binarized image in the main memory 160. It should be noted that, in an embodiment, the binarization circuit 150 may also be integrated into the image capturing device 140, so that the integrated image capturing device 140 can directly output the corresponding binarized image in response to the captured image. In this way, in some applications that only require the binarized image, a large amount of memory space for storing images can be saved. It is worth mentioning that, the invention is not limited to using the image capturing device 140 to obtain the image for the binarization operation. For example, in other embodiments, the electronic device may have a connection interface circuit unit (e.g., UART, I2C, SPI, USB or the like) and the image for the binarization operation may be received by other electronic devices through the connection interface circuit unit. As another example, the image for the binarization operation may be obtained from the storage device 120. As yet another example, the electronic device 10 may have a communication circuit unit (e.g., Wifi, Bluetooth circuit module or the like), and the image for the binarization operation may be received through the communication circuit unit.

In this embodiment, the main memory 160 is configured to temporarily store data. The main memory 160 is, for example, a dynamic random access memory and a static random access memory. In addition, a size of the main memory 160 is Y*M*N bits, and Y is a preset positive integer corresponding to the main memory. The size of the main memory is preset to be less than 128 kilobytes (KB). In this embodiment, a specific value of Y may be determined according to a specification of the main memory 160, and the M and N are determined by a specification of the image for the binarization operation (e.g., the image includes the pixels in the M×N matrix). It should be noted that, in an embodiment, the electronic device 10 does not have the main memory 160, but the processor 110 itself has a memory with small space (e.g., a storage space of the memory is less than 100 KB) for temporarily storing commands or data. In this embodiment, the memory integrated with the processor 110 can provide the function of the main memory 160.

FIG. 2 is a flowchart of an image binarization method illustrated according to an embodiment of the invention. Referring to FIG. 2, in step S21, an image is captured by the image capturing device 140, wherein the image includes a plurality of pixels in an M×N matrix, wherein M and N are positive integers.

Next, in step S22, a target pixel row arranged at the front is selected from a plurality of unselected first pixel rows among M pixel rows of the image according to a row order by a binarization circuit 150. Next, in step S23, a binarization operation is performed on the target pixel row by the binarization circuit 150 to obtain a binarized pixel row. Specifically, the binarization circuit 150 can select the target pixel row for the binarization operation starting from a pixel row arranged at the front (e.g., a 1st pixel row) or a pixel row arranged at the rear (e.g., an Mth pixel row).

More specifically, the binarization operation performed on the target pixel row includes: determining whether a bit value of the 1st pixel among N pixels of the target pixel row is a first value (e.g., 1) or a second value (e.g., 0) in a binary value according to an initial pixel threshold, wherein the initial pixel threshold is a preset value or a luminance average value of a pixel row correspondingly arranged before the target pixel row. When the target pixel row is the 1st pixel row, the initial pixel threshold is the preset value. The preset value is set to a median in a size range of the bit values of each pixel. For example, if the bit value of each pixel is 8 bits in size, the preset value can be set to 128 (i.e., $2^8$) or 127 (i.e., $2^8-1$).

Next, for one or more unselected first pixels in 2nd to Nth pixels among the N pixels of the target pixel row, a target pixel arranged at the front is selected from the one or more unselected first pixels to perform a binary value determining operation corresponding to the target pixel.

In this embodiment, the binary value determining operation includes: according to a bit value of the target pixel and a bit value of a comparison pixel correspondingly arranged before the target pixel, calculating an absolute different between the target pixel and the comparison pixel as a pixel absolute difference corresponding to the target pixel, wherein the pixel absolute difference corresponding to the 1st pixel is preset to 0; determining whether the target pixel and the comparison pixel are a same color by comparing the pixel absolute difference corresponding to the target pixel with a dynamic threshold corresponding to the comparison pixel.

In response to determining that the target pixel and the comparison pixel are the same color, the bit value of the target pixel is set to be equal to a binary value of the comparison pixel, one or more same color pixels consecutively arranged before the target pixel are identified, an average of the pixel absolute differences corresponding to the one or more same color pixels with respect to the target pixel is calculated as a pixel absolute difference average corresponding to the target pixel, and the dynamic threshold corresponding to the target pixel is calculated according to the pixel absolute difference average corresponding to the target pixel. The pixel absolute difference average corresponding to the 1st pixel is a preset pixel absolute difference average (e.g., 10), and the dynamic threshold corresponding to the 1st pixel is calculated according to the pixel absolute difference average corresponding to the 1st pixel.

Further, in response to determining that the target pixel and the comparison pixel are not the same color, the bit value of the target pixel is set to be not equal to the binary value of the comparison pixel, the pixel absolute difference average corresponding to the target pixel is set to be the preset pixel absolute difference average.

Next, whether the target pixel is a last pixel of the target pixel row is determined. In response to the target pixel being the last pixel of the target pixel row, the binarization operation performed on the target pixel row is completed; in response to the target pixel not being the last pixel of the target pixel row, another one of the first pixels arranged after the target pixel is selected as a new target pixel to perform the binary value determining operation corresponding to the new target pixel.

More specifically, in this embodiment, the step in which the dynamic threshold corresponding to the target pixel is calculated according to the pixel absolute difference average corresponding to the target pixel includes: using a sum obtained by adding a second parameter to the pixel absolute difference corresponding to the target pixel multiplied by a first parameter as the dynamic threshold corresponding to the target pixel, wherein the first parameter and the second parameter are positive integers. It should be noted that the first parameter may be preset to 3 and the second parameter may be preset to 5. However, the invention is not limited in this regard. The first parameter and the second parameter may be set to other positive integers based on requirements.

In addition, the first parameter and the second parameter may be dynamically adjusted according to the pixel absolute difference average. That is to say, the principle of setting the dynamic threshold of the invention is: (1) if the values of the same color are evenly distributed (i.e., with less light interference), the pixel absolute difference average obtained will gradually decrease, and thus the dynamic threshold will also gradually decrease. Therefore, when the color value changes (e.g., when the pixel absolute difference is greater than the dynamic threshold), it will be determined that color change is required; (2) if the values of the same color are not evenly distributed (i.e., with larger light interference), the pixel absolute difference average obtained will gradually increase, and thus the dynamic threshold will also gradually increase. Therefore, it will be determined that the change color is required only if the color value changes dramatically (e.g., when the pixel absolute difference needs to be greater than a larger dynamic threshold). In this way, the method of setting the dynamic threshold based on the pixel absolute difference average can have the effect of anti-light interference.

On the other hand, in other embodiments, the dynamic threshold corresponding to the target pixel may also be directly set as one parameter. This parameter will vary according to the pixel absolute difference between the target pixel and the comparison pixel. The larger the pixel absolute difference, the larger the parameter will be set for the dynamic threshold, and vice versa.

The detailed flow of the binarization operation performed on the target pixel row is described below with reference to FIG. 3.

Figure 3:
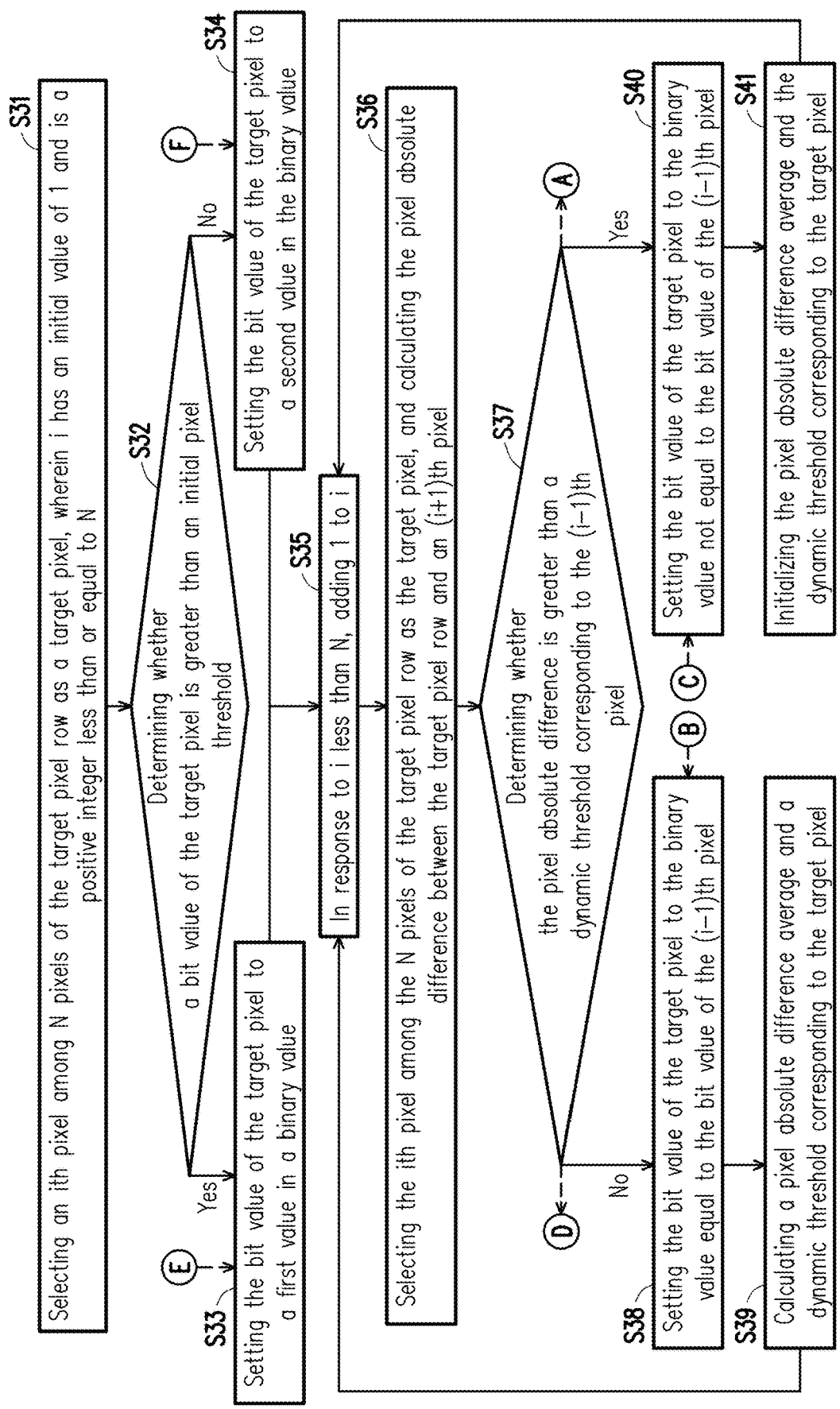
FIG. 3 is a flowchart of a binarization operation performed on the target pixel row illustrated according to an embodiment of the invention.

FIG. 3 is a flowchart of a binarization operation performed on the target pixel row illustrated according to an embodiment of the invention. Specifically, the binarization circuit 150 performs the binarization operation starting from the 1st pixel of the target pixel row. Steps S31 to S34 mainly aim at the binary value determining operation on the 1st pixel of the target pixel row. Steps S35 to S40 mainly target the binary value determining operation of the 2nd to Nth pixels of the target pixel row. Referring to FIG. 3, in step S31, the binarization circuit 150 selects an ith pixel among the N pixels of the target pixel row as the target pixel, wherein i has an initial value of 1 and is a positive integer less than or equal to N.

Next, in step S32, the binarization circuit 150 determines whether the bit value of the target pixel is greater than the initial pixel threshold. As described above, the initial pixel threshold is the preset value or the luminance average value of the pixel row correspondingly arranged before the target pixel row. For example, if the target pixel row is a 2nd pixel row of the image, the binarization circuit 150 will calculate an average of the bit values of all pixels in the 1st pixel row of the image as the initial pixel threshold corresponding the target pixel row.

In response to determining that the bit value of the target pixel is greater than the initial pixel threshold, step S33 is executed; In response to determining that the bit value of the target pixel is not greater than the initial pixel threshold, step S34 is executed.

In step S33, the binarization circuit 150 sets the bit value of the target pixel to the first value (e.g., 1) in the binary value. In step S34, the binarization circuit 150 sets the bit value of the target pixel to the second value (e.g., 0) in the binary value.

Next, in step S35, in response to i less than N, the binarization circuit 150 adds 1 to i. Next, in step S36, the binarization circuit 150 selects the ith pixel among the N pixels of the target pixel row as the target pixel, calculates the pixel absolute difference between the target pixel and an (i+1)th pixel, and calculates the pixel absolute difference average and the dynamic threshold corresponding to the target pixel.

Specifically, the binarization circuit 150 determines whether the target pixel is a last pixel of the target pixel row (when i is equal to N). If the target pixel is not the last pixel of the target pixel row (i is less than N), the binarization circuit 150 selects the next pixel (add 1 to i) as a new target pixel (S35).

In this embodiment, the binarization circuit 150 calculates the absolute different (a.k.a. the pixel absolute difference) between the bit value of the target pixel and a bit value of a pixel (the (i−1)th pixel; a.k.a. the comparison pixel) arranged before the target pixel (the ith pixel). For instance, it is assumed that the bit value of the target pixel is 150, and the bit value of the comparison pixel is 160. The pixel absolute difference between the target pixel and the comparison pixel is 10 (|150−160|=10). The pixel absolute difference corresponds to the target pixel.

Next, in step S37, the binarization circuit 150 determines whether the pixel absolute difference is greater than the dynamic threshold corresponding to the (i−1)th pixel. Specifically, in this embodiment, the binarization circuit 150 determines whether the target pixel and the comparison pixel are the same color by comparing the pixel absolute difference corresponding to the target pixel with the dynamic threshold corresponding to the comparison pixel. In other words, if the difference between the target pixel and the previous pixel (i.e., the comparison pixel) is too large (e.g., greater than the dynamic threshold), the binarization circuit 150 will determine that the color of the target pixel is different from the color of the comparison pixel.

In response to determining that the pixel absolute difference is not greater than the dynamic threshold corresponding to the (i−1)th pixel (i.e., the binarization circuit 150 determines that the target pixel and the comparison pixel are the same color), the binarization circuit 150 executes step S38; in response to determining that the pixel absolute difference is greater than the dynamic threshold corresponding to the (i−1)th pixel (i.e., the binarization circuit 150 determines that the target pixel and the comparison pixel are not the same color), the binarization circuit 150 executes step S40.

In step S38, the binarization circuit 150 sets the bit value of the target pixel to the binary value equal to the bit value of the (i−1)th pixel. That is to say, the binarization circuit 150 sets the target pixel to the color of the comparison pixel.

Next, in step S39, the binarization circuit 150 calculates the pixel absolute difference average and the dynamic threshold corresponding to the target pixel. The method of calculating the pixel absolute difference average and the dynamic threshold corresponding to the target pixel has been described above, and will not be repeated here. Then, the process proceeds to step S35.

On the other hand, in step S40, the binarization circuit 150 sets the bit value of the target pixel to the binary value not equal to the bit value of the (i−1)th pixel. That is to say, the binarization circuit 150 sets the target pixel to another color different from the color of the comparison pixel.

Next, in step S41, the binarization circuit 150 initializes the pixel absolute difference average and the dynamic threshold corresponding to the target pixel. Specifically, because the color of the target pixel is changed, the binarization circuit 150 sets the pixel absolute difference average corresponding to the target pixel as the preset pixel absolute difference average, and calculates the dynamic threshold corresponding to the target pixel according to the preset pixel absolute difference average. Then, the process proceeds to step S35.

It is worth mentioning that, in an embodiment, in response to determining that the target pixel and the comparison pixel are not the same color, the binarization circuit 150 first performs a different color determining operation before executing step S40 (via a node A).

Figure 4:
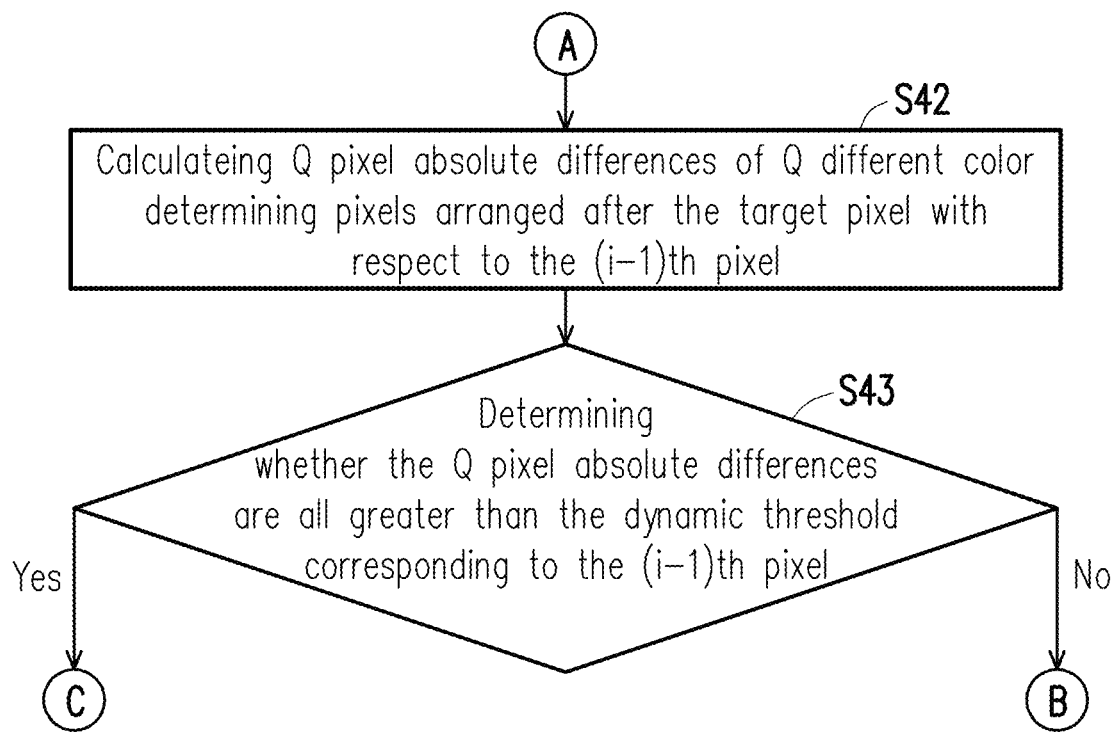
FIG. 4 is a flowchart of a different color determining operation illustrated according to an embodiment of the invention.

FIG. 4 is a flowchart of a different color determining operation illustrated according to an embodiment of the invention. Referring to FIG. 4, in step S42, the binarization circuit 150 calculates Q pixel absolute differences of Q different color determining pixels arranged after the target pixel with respect to the (i−1)th pixel. Q is a positive integer and is also known as a different color determining length (e.g., 3).

Next, in step S43, the binarization circuit 150 determines whether the Q pixel absolute differences are all greater than the dynamic threshold corresponding to the (i−1)th pixel.

In response to determining that the Q pixel absolute differences are not all greater than the dynamic threshold corresponding to the (i−1)th pixel, the binarization circuit 150 determines the target pixel as a disturbed pixel. That is, the binarization circuit 150 determines that a result of determining the target pixel and the comparison pixel are not the same color is a result of interference and is invalid (incorrect). Therefore, the binarization circuit 150 continues to execute step S38 (via a node B).

In response to determining that the Q pixel absolute difference are all greater than the dynamic threshold corresponding to the (i−1)th pixel, the binarization circuit 150 determines that the result of determining the target pixel and the comparison pixel are the same color is valid (correct). Therefore, the binarization circuit 150 continues to execute step S40 (via a node C).

Specifically, because the design principle of the two-dimensional barcode does not allow the color of one pixel in a pixel row to be different from the colors of multiple adjacent pixels. When determining that the target pixel needs to change color, the binarization circuit 150 will first determine whether the absolute differences of the Q different color determining pixels arranged after the target pixel with respect to the comparison pixel are all greater than the dynamic threshold corresponding to the comparison pixel. That is, the binarization circuit 150 pre-determines whether the Q different color determining pixels arranged after the target pixel that needs to change color also need to be set to the color/the binary value of the target pixel. If the colors/the binary values of the Q different color determining pixels are the same as those of the target pixel, the binarization circuit 150 determines that the target pixel needs to change color, and the binarization circuit 150 also directly sets the binary values of the Q different color determining pixels Q to be the binary value of the target pixel.

It is worth mentioning that, in an embodiment, in response to determining that the target pixel and the comparison pixel are the same color, the binarization circuit 150 first performs an accumulative error determining operation before executing step S38 (via a node D).

Figure 5:
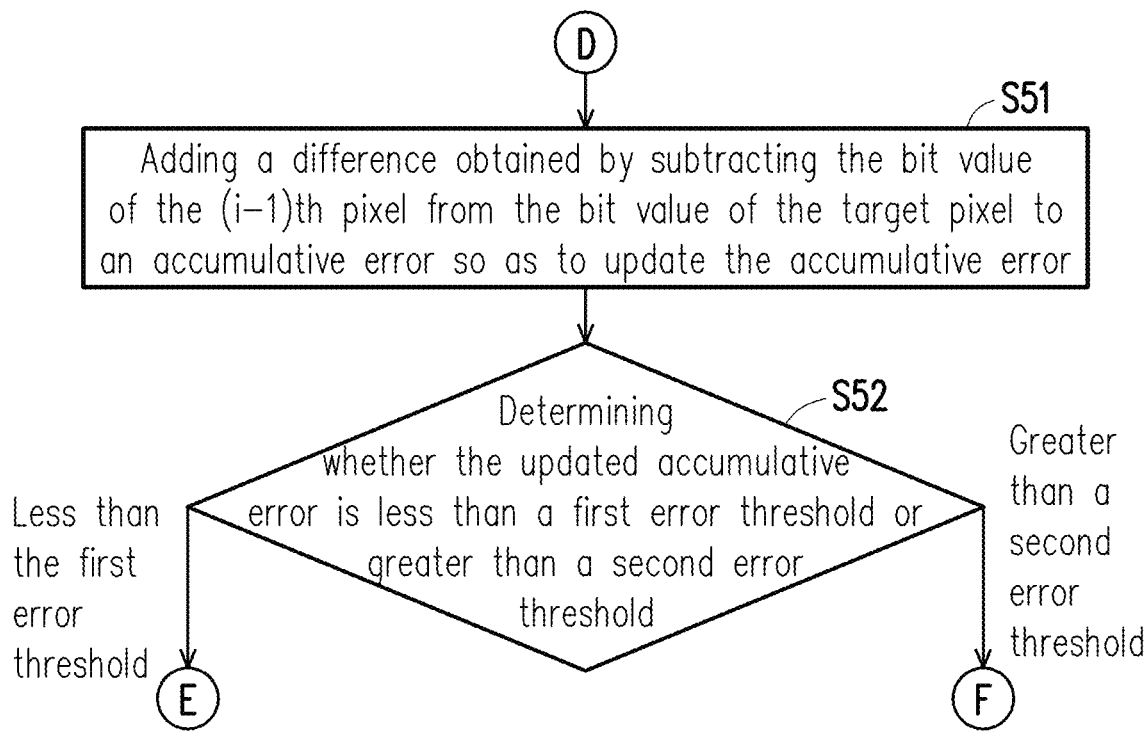
FIG. 5 is a flowchart of an accumulative error determining operation illustrated according to an embodiment of the invention.

FIG. 5 is a flowchart of an accumulative error determining operation illustrated according to an embodiment of the invention. Referring to FIG. 5, in step S51, the binarization circuit 150 adds a difference obtained by subtracting the bit value of the (i−1)th pixel from the bit value of the target pixel to an accumulative error so as to update the accumulative error. In step S52, the binarization circuit 150 determines whether the updated accumulative error is less than a first error threshold or greater than a second error threshold. The first error threshold is, for example, −100; the second error threshold is, for example, +100. Nevertheless, the invention is not limited in this regard. The first error threshold and the second error threshold may be preset according to requirements.

In response to determining that the updated accumulative error is less than the first error threshold, the binarization circuit 150 sets the bit value of the target pixel to the first value in the binary value. That is, step S33 is executed (via a node E).

On the other hand, in response to determining that the updated accumulative error is greater than the second error threshold, the binarization circuit 150 sets the bit value of the target pixel to the second value in the binary value. That is, step S34 is executed (via a node F). It is worth mentioning that, the function of the accumulative error is to correct a determination error of the binary values caused by the bit values of the pixels actually getting closer to pure white or pure black but the pixels less than the dynamic threshold are all still determined as no color change due to the accumulative error.

Next, after performing the accumulative error determining operation to determine whether to directly set the target pixel to the first value or the second value, the binarization circuit 150 determines whether to execute step S39 or step S41 according to whether the set binary value of the target pixel is the same as the binary value of the comparison pixel.

For example, in this embodiment, in response to the binary value of the target pixel not equal to the binary value of the comparison pixel, the binarization circuit 150 resets the accumulative error to the initial value, sets the pixel absolute difference average corresponding to the target pixel as the preset pixel absolute difference average, and calculates the dynamic threshold corresponding to the target pixel according to the preset pixel absolute difference average (S41). The initial value is, for example, 0.

Further, in response to the binary value of the target pixel equal to the binary value of the comparison pixel, the binarization circuit 150 calculates the pixel absolute difference average corresponding to the target pixel, and calculates the dynamic threshold corresponding to the target pixel according to the pixel absolute difference average corresponding to the target pixel (S39).

FIG. 6 is a schematic diagram of converting the target pixel row into a binarized pixel row illustrated according to an embodiment of the invention. Referring to FIG. 6, for instance, it is assumed that the target pixel row has 18 pixels P(1) to P(18) (N=18). The bit values corresponding to the pixels P(1) to P(18) are as shown by a table 600.

First of all, i is equal to 1 (the 1st pixel), and for the pixel P(1): the binarization circuit 150 sets the pixel absolute difference (PAD) corresponding to the pixel (1) to "0"; sets the pixel absolute difference average corresponding to the pixel P(1) to the preset pixel absolute difference average (i.e., PADA; 10); calculates the dynamic threshold corresponding to the pixel P(1) as "35"; sets the accumulative error corresponding to the pixel P(1) to "0"; determines that the binary value of the pixel P(1) is "0" according to the bit value and the initial pixel threshold of the pixel P(1).

Next, for the pixel P(2): the binarization circuit 150 calculates that the pixel absolute difference between the pixel P(2) and the pixel P(1) is "3" and the accumulative error is "−3" (i.e., −3+0=−3) according to the bit value "10" of the pixel P(2) and the bit value "13" of the pixel P(1); determines that the pixel P(2) and the pixel P(1) are the same color since the pixel absolute difference "3" corresponding to the pixel P(2) is determined as being less than the dynamic threshold "35" corresponding to the pixel P(1), and sets the binary value of the pixel P(2) to "0"; calculates that the pixel absolute difference average corresponding to the pixel P(2) is "6.5" (i.e., (10+3)/2=6.5) and calculates that the dynamic threshold corresponding to the pixel P(2) is "24.5" (i.e., 6.5*3+5=24.5).

Next, for the pixel P(3): the binarization circuit 150 calculates that the pixel absolute difference between the pixel P(3) and the pixel P(2) is "7" and the accumulative error is "+4" (i.e., −3+7=+4) according to the bit value "17" of the pixel P(3) and the bit value "10" of the pixel P(2); determines that the pixel P(3) and the pixel P(2) are the same color since the pixel absolute difference "7" corresponding to the pixel P(3) is determined as being less than the dynamic threshold "24.5" corresponding to the pixel P(2), and sets the binary value of the pixel P(3) to "0"; calculates that the pixel absolute difference average corresponding to the pixel P(3) is "6.67" (i.e., (10+3)/3=6.67) and calculates that the dynamic threshold corresponding to the pixel P(3) is "25".

Next, for the pixel P(4): the binarization circuit 150 calculates that the pixel absolute difference between the pixel P(4) and the pixel P(3) is "16" and the accumulative error is "+20" (i.e., +16+4=+20) according to the bit value "33" of the pixel P(4) and the bit value "17" of the pixel P(3); determines that the pixel P(4) and the pixel P(3) are the same color since the pixel absolute difference "16" corresponding to the pixel P(4) is determined as being less than the dynamic threshold "25" corresponding to the pixel P(3), and sets the binary value of the pixel P(4) to "0"; calculates that the pixel absolute difference average corresponding to the pixel P(4) is "9" (i.e., (10+3+7+16)/4=9) and calculates that the dynamic threshold corresponding to the pixel P(4) is "32".

Next, for the pixel P(5): the binarization circuit 150 calculates that the pixel absolute difference between the pixel P(5) and the pixel P(4) is "148" and the accumulative error is "+168" (i.e., +148+20=+168) according to the bit value "181" of the pixel P(5) and the bit value "33" of the pixel P(4); determines that the pixel P(5) and the pixel P(4) are not the same color since the pixel absolute difference "148" corresponding to the pixel P(5) is determined as being greater than the dynamic threshold "32" corresponding to the pixel P(4); performs the different color determining operation (with the different color determining length being 3), determines that the pixel absolute differences of the pixels P(6) to P(8) (e.g., 160, 149 and 157) with respect to the pixel P(4) are all greater than the dynamic threshold "32" corresponding to the pixel P(4), confirms that the pixel P(5) and the pixel P(4) are not the same color, and sets the binary values of the pixels P(5) to P(8) to "1"; resets the pixel absolute difference average corresponding to the pixel P(5) to "10", resets the accumulative error corresponding to the pixel P(5) to "0", and calculates that the dynamic threshold corresponding to the pixel P(5) is "35".

Next, for the pixel P(6): the binarization circuit 150 calculates that the pixel absolute difference between the pixel P(6) and the pixel P(5) is "12" and the accumulative error is "+12" (i.e., +12+0=+12) according to the bit value "193" of the pixel P(6) and the bit value "181" of the pixel P(5); calculates that the pixel absolute difference average corresponding to the pixel P(6) is "11" (i.e., (10+12)/2=11) and calculates that the dynamic threshold corresponding to the pixel P(6) is "38" (the binary value of the pixel P(6) is already set to "1"). The process for the pixels P(7) and P(8) is similar to that of the pixel P(6), and will not be repeated here.

Next, for the pixel P(9): the binarization circuit 150 calculates that the pixel absolute difference between the pixel P(9) and the pixel P(8) is "1" and the accumulative error is "+12" according to the bit value "191" of the pixel P(9) and the bit value "190" of the pixel P(8); determines that the pixel P(9) and the pixel P(8) are the same color since the pixel absolute difference "1" corresponding to the pixel P(9) is determined as being less than the dynamic threshold "34.25" corresponding to the pixel P(8), and sets the binary value of the pixel P(9) to "1"; calculates that the pixel absolute difference average corresponding to the pixel P(9) is "8" and calculates that the dynamic threshold corresponding to the pixel P(9) is "29".

Next, for the pixel P(10): the binarization circuit 150 calculates that the pixel absolute difference between the pixel P(10) and the pixel P(9) is "2" and the accumulative error is "+10" according to the bit value "189" of the pixel P(10) and the bit value "191" of the pixel P(9); determines that the pixel P(10) and the pixel P(9) are the same color since the pixel absolute difference "2" corresponding to the pixel P(10) is determined as being less than the dynamic threshold "29" corresponding to the pixel P(9), and sets the binary value of the pixel P(10) to "1"; calculates that the pixel absolute difference average corresponding to the pixel P(10) is "7" and calculates that the dynamic threshold corresponding to the pixel P(9) is "26".

Next, for the pixel P(11): the binarization circuit 150 calculates that the pixel absolute difference between the pixel P(11) and the pixel P(10) is "31" and the accumulative error is "−22" according to the bit value "158" of the pixel P(11) and the bit value "189" of the pixel P(10); determines that the pixel P(11) and the pixel P(10) are not the same color since the pixel absolute difference "31" corresponding to the pixel P(11) is determined as being greater than the dynamic threshold "26" corresponding to the pixel P(10); performs the different color determining operation, deter-mines that the pixel absolute differences of the pixels P(12) to P(14) (e.g., 10, 9 and 25) with respect to the pixel P(10) are not all greater than the dynamic threshold "26" corresponding to the pixel P(10), confirms that the pixel P(11) is the disturbed pixel, and confirms that the pixel P(11) and the pixel P(10) are the same color; sets the binary value of the pixel P(11) to "1"; calculates that the pixel absolute difference average corresponding to the pixel P(11) is "11.75" and calculates that the dynamic threshold corresponding to the pixel P(11) is "32.375". The process for the pixels P(12) to P(16) is similar to that of the pixel P(10), and will not be repeated here.

It is worth mentioning that, the pixel P(11) may be determined as the disturbed pixel through the above-mentioned different color determining operation to avoid incorrect color change determination (the determination for changing the binary value).

Next, for the pixel P(17): the binarization circuit 150 calculates that the pixel absolute difference between the pixel P(17) and the pixel P(16) is "32" and the accumulative error is "−102" according to the bit value "78" of the pixel P(17) and the bit value "110" of the pixel P(16); determines that the pixel P(17) and the pixel P(16) are the same color since the pixel absolute difference "32" corresponding to the pixel P(17) is determined as not being greater than the dynamic threshold "46.25" corresponding to the pixel P(16), and sets the binary value of the pixel P(17) to "1".

As described above, when it is determined that the pixel absolute difference "32" corresponding to the pixel P (17) is not greater than the dynamic threshold "46.25" corresponding to the pixel P(16), the accumulative error determining operation may be performed. At this time, in response to determining that the accumulative error is less than the first error threshold (−100), the binary value of the pixel P(17) is set to "0"; the pixel absolute difference average corresponding to the pixel P(17) is reset to "10", the accumulative error corresponding to the pixel P(17) is reset to "0", and the dynamic threshold corresponding to the pixel P(17) is calculated as "35". That is to say, in this example, although the pixel absolute differences corresponding to the pixels will not cause color to change, the accumulative error of the pixel is already lowered to some extent (e.g., lower than the first error threshold), and thus the binarization circuit 150 directly sets the pixel to the first value in the binary value (e.g., 0 (black)). In this way, it is possible to prevent the accumulative difference between the pixels from causing errors in determining color change.

Next, for the pixel P(18): the binarization circuit 150 calculates that the pixel absolute difference between the pixel P(18) and the pixel P(17) is "18" and the accumulative error is "−18" according to the bit value "60" of the pixel P(18) and the bit value "78" of the pixel P(17); determines that the pixel P(18) and the pixel P(17) are the same color since the pixel absolute difference "18" corresponding to the pixel P(18) is determined as being less than the dynamic threshold "35" corresponding to the pixel P(17), and sets the binary value of the pixel P(18) to "0"; calculates that the pixel absolute difference average corresponding to the pixel P(18) is "14" and calculates that the dynamic threshold corresponding to the pixel P(18) is "47".

After completing the binarization operation performed on the target pixel row, the binarization circuit 150 can regard all the pixels of the target pixel row in which the bit values are set to the binary values as one binarized pixel row. That is, the target pixel row is converted into the binarized pixel row. Returning to FIG. 2, next, in step S25, whether the M pixel rows are all selected determined by the binarization circuit 150. In response to determining that the M pixel rows are all selected (i.e., M binarized pixel rows are obtained), step S26 is executed; in response to determining that the M pixel rows are not all selected (i.e., the binarization operation still needs to be performed on one or more unselected pixel rows), step S22 is executed;

In step S26, the binarization operation performed on the image is completed by the binarization circuit 150. Specifically, at this time, the binarization circuit 150 has binarized the M pixel rows into M binarized pixel rows, and the binarization circuit 150 determines that the binarization operation of the entire image has been completed.

Then, in step S27, a binarized image composed of the M binarized pixel rows stored in the main memory is transmitted to the decoder 130 by the processor 110. In step S28, a decoding operation is performed by the decoder 130 on the binarized image to obtain decoding information corresponding to the image.

Specifically, the processor 110 combines the M binarized pixel rows into the binarized image corresponding to the image, and transmits the binarized image to the decoder 130 to try to obtain information (a.k.a. the decoding information) contained in the image. For example, text information contained in QR Code of the image is obtained. The decoding operation of the decoder 130 for decoding the binarized image is not the main technical feature of the invention, and the details regarding the are omitted here.

It should be noted that, in an embodiment, steps S27 and S28 will not be executed, and instead, step S26 continues to step S29. In step S29, the processor 110 stores the binarized image composed of the M binarized pixel rows stored in the main memory 160 to the storage device 120. Specifically, the processor 110 further stores the combined binarized image to the storage device 120 to facilitate related applications of the binarized image later. The related applications include, but are not limited to, the aforementioned decoding operation.

Figure 7:
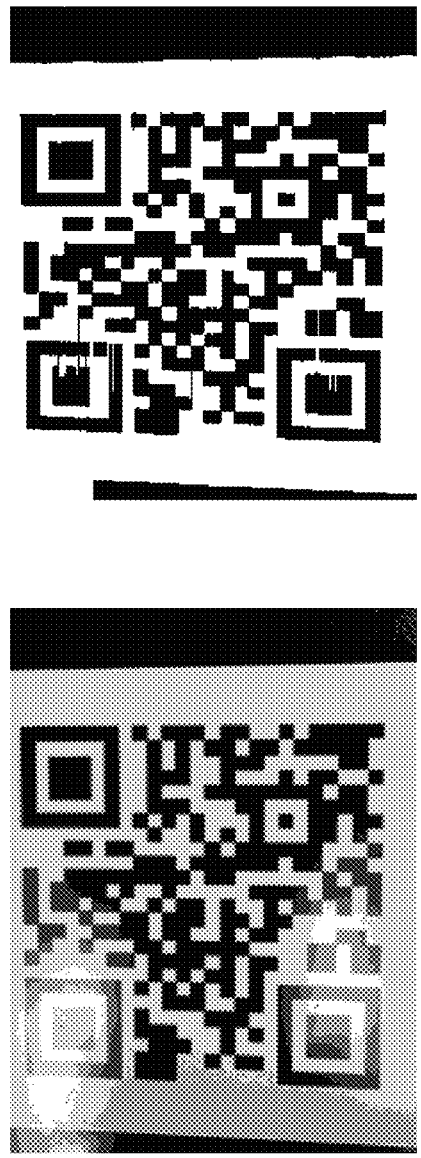
FIG. 7 is a comparison diagram between an image and a corresponding binarized image illustrated according to an embodiment of the invention.

FIG. 7 is a comparison diagram between an image and a corresponding binarized image illustrated according to an embodiment of the invention. Referring to FIG. 7, when the captured image is disturbed by light (e.g., QR Code shown by the left portion of FIG. 7), the image binarization method and the electronic device provided by various embodiments of the invention can still correctly obtain the corresponding binarized image (e.g., QR Code shown by the right portion of FIG. 7) by using the comparison result of certain pixel absolute differences and the corresponding dynamic thresholds. Compared with the traditional method, an excessively high binarization threshold may be calculated when the captured image is disturbed by light in the traditional method (e.g., QR Code shown by the left portion of FIG. 7), which may cause a distortion of the subsequently obtained binarized image and a failure in the corresponding decoding operation.

In addition, the size of the binarized image provided by the embodiment of the invention will also be greatly reduced after the binarization. For example, as described above, traditionally, taking a 640×680 monochrome picture as an example, it requires at least 425 KB of storage space. However, the size of the 640×680 binarized image obtained by the embodiment of the invention can be reduced to 53.125 KB, and the binarized image can just be stored in the memory of a general microcontroller (usually about 64 KB) on the market. In this way, by implementing the image binarization method provided by the embodiment of the invention, the microcontroller on the market can be provided with the capability of performing image decoding operations or related applications (e.g., the decoding operation of 2D barcode) corresponding to the binarized image. Therefore, the function of the microcontroller can be enhanced, thereby reducing the hardware cost of adding large-capacity memory.

In summary, the image binarization method and the electronic device provided by the various embodiments of the invention can allow the electronic device/processor/microcontroller having the memory with smaller storage space to efficiently capture the image and perform the binarization operation on the image to convert the image into a smaller binarized image. The converted binarized image can be stored in the memory with smaller storage space and can be further decoded, thereby expanding the function of the electronic device/processor having the memory with smaller storage space. As a result, the electronic devices/processors/microcontrollers with smaller memory can also serve the application fields of 2D barcodes (or other image processing). Accordingly, the working efficiency of the electronic device/processor/microcontroller can be further enhanced and the cost of purchasing an electronic device/processor/microcontroller with larger memory can be saved.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

The invention claimed is:

1. An image binarization method adapted to an electronic device having a main memory, wherein the electronic device further comprises an image capturing device and a binarization circuit, and the method comprises:

capturing an image by the image capturing device, wherein the image comprises a plurality of pixels in an M×N matrix, wherein M and N are positive integers, wherein a size of the main memory is Y*M*N bits, wherein Y is a preset positive integer corresponding to the main memory;

selecting a target pixel row arranged at the front from one or more unselected first pixel rows among M pixel rows of the image according to a row order by the binarization circuit;

performing, by the binarization circuit, a binarization operation on the target pixel row to obtain a binarized pixel row, wherein a binarized value of one of the pixels in the binarized pixel row is determined by calculating an absolute difference between the one of the pixels in the binarized pixel row and a previous pixel in the binarized pixel row;

storing the binarized pixel row to the main memory by the binarization circuit;

determining, by the binarization circuit, whether the M pixel rows are all selected;

in response to the M pixel rows not all being selected, performing the step of selecting the target pixel row arranged at the front from the one or more unselected first pixel rows among the M pixel rows of the image according to the row order by the binarization circuit again;

in response to the M pixel rows all being selected, completing the binarization operation on the image by the binarization circuit.

2. The image binarization method of claim 1, wherein the electronic device further comprises a processor and a decoder, and the method further comprises:

transmitting, by the processor, a binarized image composed of M binarized pixel rows stored in the main memory to the decoder; and performing, by the decoder, a decoding operation on the binarized image to obtain decoding information corresponding to the image.

3. The image binarization method of claim 1, wherein the binarization operation performed on the target pixel row comprises:

determining whether a bit value of a 1st pixel among N pixels of the target pixel row is a first value or a second value in a binary value according to an initial pixel threshold, wherein the initial pixel threshold is a preset value or a luminance average value of a pixel row correspondingly arranged before the target pixel row;

for one or more unselected first pixels in 2nd to Nth pixels among the N pixels of the target pixel row, selecting a target pixel arranged at the front from the one or more unselected first pixels to perform a binary value determining operation corresponding to the target pixel, the binary value determining operation comprising:

according to a bit value of the target pixel and a bit value of a comparison pixel correspondingly arranged before the target pixel, calculating an absolute different between the target pixel and the comparison pixel as a pixel absolute difference corresponding to the target pixel, wherein the pixel absolute difference corresponding to the 1st pixel is preset to 0;

determining whether the target pixel and the comparison pixel are a same color by comparing the pixel absolute difference corresponding to the target pixel with a dynamic threshold corresponding to the comparison pixel, wherein in response to determining that the target pixel and the comparison pixel are the same color, the bit value of the target pixel is set to be equal to a binary value of the comparison pixel, one or more same color pixels consecutively arranged before the target pixel are identified, an average of the pixel absolute differences corresponding to the one or more same color pixels with respect to the target pixel is calculated as a pixel absolute difference average corresponding to the target pixel, and the dynamic threshold corresponding to the target pixel is calculated according to the pixel absolute difference average corresponding to the target pixel, wherein the pixel absolute difference average corresponding to the 1st pixel is a preset pixel absolute difference average, and the dynamic threshold corresponding to the 1st pixel is calculated according to the pixel absolute difference average corresponding to the 1st pixel, wherein in response to determining that the target pixel and the comparison pixel are not the same color, the bit value of the target pixel is set to be not equal to the binary value of the comparison pixel, the pixel absolute difference average corresponding to the target pixel is set to be the preset pixel absolute difference average; and determining whether the target pixel is a last pixel of the target pixel row, wherein in response to the target pixel being the last pixel of the target pixel row, the binarization operation performed on the target pixel row is completed, wherein in response to the target pixel not being the last pixel of the target pixel row, another one of the first pixels arranged after the target pixel is selected as a new target pixel to perform the binary value determining operation corresponding to the new target pixel.

4. The image binarization method of claim 3, wherein the step in which the dynamic threshold corresponding to the target pixel is calculated according to the pixel absolute difference average corresponding to the target pixel comprises:

using a sum obtained by adding a second parameter to the pixel absolute difference corresponding to the target pixel multiplied by a first parameter as the dynamic threshold corresponding to the target pixel, wherein the first parameter and the second parameter are positive integers.

5. The image binarization method of claim 3, wherein in response to determining that the target pixel and the comparison pixel are not the same color, before the step in which the bit value of the target pixel is set to be not equal to the binary value of the comparison pixel, the method further comprises:

calculating Q pixel absolute differences of Q different color determining pixels arranged after the target pixel with respect to the comparison pixel, wherein Q is another preset positive integer; and determining whether the Q pixel absolute differences are all greater than the dynamic threshold corresponding to the comparison pixel, wherein in response to the Q pixel absolute differences not all being greater than the dynamic threshold corresponding to the comparison pixel, the target pixel is determined as a disturbed pixel, the target pixel and the comparison pixel are determined as the same color, the step in which the bit value of the target pixel is set to be not equal to the binary value of the comparison pixel is not performed, and the step in which the bit value of the target pixel is set to be equal to the binary value of the comparison pixel is performed, wherein in response to the Q pixel absolute differences all being greater than the dynamic threshold corresponding to the comparison pixel, the target pixel and the comparison pixel are confirmed as not being the same color, and the step in which the bit value of the target pixel is set to be not equal to the binary value of the comparison pixel is performed.

6. The image binarization method of claim 3, wherein in response to determining that the target pixel and the comparison pixel are the same color, before the step in which the bit value of the target pixel is set to be equal to the binary value of the comparison pixel, the method further comprises:

adding a difference obtained by subtracting the bit value of the comparison pixel from the bit value of the target pixel to an accumulative error so as to update the accumulative error, wherein an initial value of the accumulative error is 0, wherein when the bit value of the target pixel is set to be not equal to the binary value of the comparison pixel, the accumulative error is reset to the initial value; and determining whether the updated accumulative error is less than a first error threshold or greater than a second error threshold, wherein in response to determining that the updated accumulative error is less than the first error threshold, the bit value of the target pixel is set to the first value in the binary value, wherein in response to determining that the updated accumulative error is greater than the second error threshold, the bit value of the target pixel is set to the second value in the binary value, wherein in response to the binary value of the target pixel not equal to the binary value of the comparison pixel, the binarization circuit resets the accumulative error to the initial value, sets the pixel absolute difference average corresponding to the target pixel as the preset pixel absolute difference average, and calculates the dynamic threshold corresponding to the target pixel according to the preset pixel absolute difference average, wherein in response to the binary value of the target pixel equal to the binary value of the comparison pixel, the binarization circuit calculates the pixel absolute difference average corresponding to the target pixel, and calculates the dynamic threshold corresponding to the target pixel according to the pixel absolute difference average corresponding to the target pixel.

7. The image binarization method of claim 3, wherein the first value is 1, and the second value is 0.

8. The image binarization method of claim 1, wherein a size of the main memory is less than 128 kilobytes (KB).

9. The image binarization method of claim 1, wherein the main memory comprises a dynamic random access memory and a static random access memory.

10. The image binarization method of claim 1, wherein the image capturing device comprises a charge-couple device image sensor or a complementary metal oxide semiconductor image sensor.

11. An electronic device, comprising:
an image capturing device;
a main memory;
and a binarization circuit, electrically connected to the image capturing device and the main memory,
wherein the image capturing device is configured to capture an image, wherein the image comprises a plurality of pixels in an M×N matrix, wherein M and N are positive integers, wherein a size of the main memory is Y*M*N bits, wherein Y is a preset positive integer corresponding to the main memory,
wherein the binarization circuit is configured to select a target pixel row arranged at the front from one or more unselected first pixel rows among M pixel rows of the image according to a row order,
wherein the binarization circuit is further configured to perform a binarization operation on the target pixel row to obtain a binarized pixel row, wherein a binarized value of one of the pixels in the binarized pixel row is determined by calculating an absolute difference between the one of the pixels in the binarized pixel row and a previous pixel in the binarized pixel row,
wherein the binarization circuit is further configured to store the binarized pixel row to the main memory;
wherein the binarization circuit is further configured to determine whether the M pixel rows are all selected,
wherein in response to the M pixel rows not all being selected, the binarization circuit is further configured to perform the step of selecting the target pixel row arranged at the front from the one or more unselected first pixel rows among the M pixel rows of the image according to the row order by the binarization circuit again,
wherein in response to the M pixel rows all being selected, the binarization circuit is further configured to complete the binarization operation on the image.

12. The electronic device of claim 11, wherein the electronic device further comprises a processor and a decoder,
wherein the processor transmits a binarized image composed of M binarized pixel rows stored in the main memory to the decoder,
wherein the decoder performs a decoding operation on the binarized image to obtain decoding information corresponding to the image.

13. The electronic device of claim 11, wherein in the binarization operation performed on the target pixel row,
the binarization circuit determines whether a bit value of a 1st pixel among N pixels of the target pixel row is a first value or a second value in a binary value according to an initial pixel threshold, wherein the initial pixel threshold is a preset value or a luminance average value of a pixel row correspondingly arranged before the target pixel row,
for one or more unselected first pixels in 2nd to Nth pixels among the N pixels of the target pixel row, the binarization circuit selects a target pixel arranged at the front from the one or more unselected first pixels to perform a binary value determining operation corresponding to the target pixel, and in the binary value determining operation,
according to a bit value of the target pixel and a bit value of a comparison pixel correspondingly arranged before the target pixel, the binarization circuit calculates an absolute different between the target pixel and the comparison pixel as a pixel absolute difference corresponding to the target pixel, wherein the pixel absolute difference corresponding to the 1st pixel is preset to 0,
wherein the binarization circuit determines whether the target pixel and the comparison pixel are a same color by comparing the pixel absolute difference corresponding to the target pixel with a dynamic threshold corresponding to the comparison pixel,
wherein in response to determining that the target pixel and the comparison pixel are the same color, the binarization circuit sets the bit value of the target pixel to be equal to a binary value of the comparison pixel, identifies one or more same color pixels consecutively arranged before the target pixel, calculates an average of the pixel absolute differences corresponding to the one or more same color pixels with respect to the target pixel as a pixel absolute difference average corresponding to the target pixel, and calculates the dynamic threshold corresponding to the target pixel according to the pixel absolute difference average corresponding to the target pixel, wherein the pixel absolute difference average corresponding to the 1st pixel is a preset pixel absolute difference average, and the dynamic threshold corresponding to the 1st pixel is calculated according to the pixel absolute difference average corresponding to the 1st pixel,
wherein in response to determining that the target pixel and the comparison pixel are not the same color, the binarization circuit sets the bit value of the target pixel to be not equal to the binary value of the comparison pixel, sets the pixel absolute difference average corresponding to the target pixel to be the preset pixel absolute difference average,
wherein the binarization circuit determines whether the target pixel is a last pixel of the target pixel row,
wherein in response to the target pixel being the last pixel of the target pixel row, the binarization circuit completes the binarization operation performed on the target pixel row, wherein in response to the target pixel not being the last pixel of the target pixel row, the binarization circuit selects another one of the first pixels arranged after the target pixel as a new target pixel to perform the binary value determining operation corresponding to the new target pixel.

14. The electronic device of claim 13, wherein in the operation of calculating the dynamic threshold corresponding to the target pixel according to the pixel absolute difference average corresponding to the target pixel,
the binarization circuit uses a sum obtained by adding a second parameter to the pixel absolute difference corresponding to the target pixel multiplied by a first parameter as the dynamic threshold corresponding to the target pixel, wherein the first parameter and the second parameter are positive integers.

15. The electronic device of claim 13, wherein in response to determining that the target pixel and the comparison pixel are not the same color, before the operation of setting the bit value of the target pixel to be not equal to the binary value of the comparison pixel,
the binarization circuit calculates Q pixel absolute differences of Q different color determining pixels arranged after the target pixel with respect to the comparison pixel, wherein Q is another preset positive integer,
wherein the binarization circuit determines whether the Q pixel absolute differences are all greater than the dynamic threshold corresponding to the comparison pixel,
wherein in response to the Q pixel absolute differences not all being greater than the dynamic threshold corresponding to the comparison pixel, the binarization circuit determines the target pixel as a disturbed pixel, determines that the target pixel and the comparison pixel are the same color, does not perform the step in which the bit value of the target pixel is set to be not equal to the binary value of the comparison pixel, and performs the step in which the bit value of the target pixel is set to be equal to the binary value of the comparison pixel,
wherein in response to the Q pixel absolute differences all being greater than the dynamic threshold corresponding to the comparison pixel, the binarization circuit confirms that the target pixel and the comparison pixel are not the same color, and performs the step in which the bit value of the target pixel is set to be not equal to the binary value of the comparison pixel.

16. The electronic device of claim 13, wherein in response to determining that the target pixel and the comparison pixel are the same color, before the operation of setting the bit value of the target pixel to be equal to the binary value of the comparison pixel,
the binarization circuit adds a difference obtained by subtracting the bit value of the comparison pixel from the bit value of the target pixel to an accumulative error so as to update the accumulative error, wherein an initial value of the accumulative error is 0,
wherein the binarization circuit determines whether the updated accumulative error is less than a first error threshold or greater than a second error threshold,
wherein in response to determining that the updated accumulative error is less than the first error threshold, the binarization circuit sets the bit value of the target pixel to the first value in the binary value,
wherein in response to determining that the updated accumulative error is greater than the second error threshold, the binarization circuit sets the bit value of the target pixel to the second value in the binary value,
wherein in response to the binary value of the target pixel not equal to the binary value of the comparison pixel, the binarization circuit resets the accumulative error to the initial value, sets the pixel absolute difference average corresponding to the target pixel as the preset pixel absolute difference average, and calculates the dynamic threshold corresponding to the target pixel according to the preset pixel absolute difference average,
wherein in response to the binary value of the target pixel equal to the binary value of the comparison pixel, the binarization circuit calculates the pixel absolute difference average corresponding to the target pixel, and calculates the dynamic threshold corresponding to the target pixel according to the pixel absolute difference average corresponding to the target pixel.

17. The electronic device of claim 13, wherein the first value is 1, and the second value is 0.

18. The electronic device of claim 11, wherein a size of the main memory is less than 128 kilobytes (KB).

19. The electronic device of claim 11, wherein the main memory comprises a dynamic random access memory and a static random access memory.

20. The electronic device of claim 11, wherein the image capturing device comprises a charge-couple device image sensor or a complementary metal oxide semiconductor image sensor.

* * * * *